United States Patent
Xiong

(10) Patent No.: US 10,483,864 B1
(45) Date of Patent: Nov. 19, 2019

(54) METHOD FOR DETECTING SHORT CIRCUIT CONDITIONS IN FREQUENCY CONTROL LOOP COMPONENTS

(71) Applicant: UNIVERSAL LIGHTING TECHNOLOGIES, INC., Madison, AL (US)

(72) Inventor: Wei Xiong, Madison, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 0 days.

(21) Appl. No.: 16/142,543

(22) Filed: Sep. 26, 2018

Related U.S. Application Data

(60) Provisional application No. 62/565,616, filed on Sep. 29, 2017.

(51) Int. Cl.
  *H02M 3/338* (2006.01)
  *H02M 3/337* (2006.01)

(52) U.S. Cl.
  CPC ......... *H02M 3/338* (2013.01); *H02M 3/3376* (2013.01)

(58) Field of Classification Search
  CPC ........... H02M 3/335–42; Y02B 20/142; Y02B 20/185; Y02B 20/348; Y02B 70/1433
  USPC ................. 363/21.02, 21.03, 97, 98
  See application file for complete search history.

(56) References Cited

U.S. PATENT DOCUMENTS

| | | | |
|---|---|---|---|
| 9,837,913 B1 | 12/2017 | Xiong | |
| 10,098,194 B1 * | 10/2018 | Xiong | H05B 33/0821 |
| 2015/0103562 A1 * | 4/2015 | Yeh | H02M 3/3353 363/17 |
| 2017/0093296 A1 * | 3/2017 | Chen | H02M 1/088 |
| 2017/0187298 A1 * | 6/2017 | Lin | H02M 3/33523 |
| 2017/0222565 A1 * | 8/2017 | Sonobe | H02M 1/14 |
| 2018/0262118 A1 * | 9/2018 | Ouyang | H02M 3/335 |

OTHER PUBLICATIONS

International Rectifier. "IRS27915S". pp. 1-29. Aug. 27, 2015. (Year: 2015).*
International Rectifier, "IRS27951S, IRS27952(4)S", Aug. 27, 2015, pp. 1-29 (Year: 2015).

* cited by examiner

*Primary Examiner* — Kyle J Moody
*Assistant Examiner* — Peter M Novak
(74) *Attorney, Agent, or Firm* — Patterson Intellectual Property Law, P.C.; Gary L. Montle; Jerry Turner Sewell

(57) ABSTRACT

A DC-to-AC inverter provides an AC voltage to the primary winding of an output isolation transformer having at least one secondary winding. An AC output voltage from the secondary winding is rectified to generate a DC voltage, which is applied to a load. The current flowing through the load is sensed and compared to a reference magnitude to produce a feedback signal. The feedback signal controls a voltage superposition circuit via an output stage of an optocoupler. The superposition circuit generates a superposition voltage that is applied to a current control circuit, which responds to the superposition voltage to vary a control current to a switching controller, which varies the frequency of the AC voltage to thereby vary the load current. A fault detection circuit senses a short in the output stage of the optocoupler to disable the operation of switching controller to prevent an overvoltage and an overcurrent.

20 Claims, 4 Drawing Sheets

US 10,483,864 B1

METHOD FOR DETECTING SHORT CIRCUIT CONDITIONS IN FREQUENCY CONTROL LOOP COMPONENTS

CROSS-REFERENCE TO RELATED APPLICATION

This application claims the benefit under 35 U.S.C. § 119(e) of U.S. Provisional Application No. 62/565,616, filed Sep. 29, 2017, entitled "Method for Detecting Short Circuit Conditions in Frequency Control Loop Components," which is hereby incorporated by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

FIELD OF THE INVENTION

The present disclosure relates generally to power supplies that provide a DC current to a load such as light-emitting diodes. More particularly, the present disclosure relates to an apparatus and a method for sensing current through the load to provide feedback to the power supply to enable the power supply to maintain a substantially constant current through the load.

BACKGROUND

A DC-to-DC converter drives a DC load such as one or more light-emitting diodes (LEDs) or the like. The converter includes a DC-to-AC inverter in a primary circuit. The inverter generates a switched AC voltage, which is applied to the primary winding of an isolation transformer. A secondary winding provides an input to an AC-to-DC rectifier in a secondary circuit. The rectifier produces a DC voltage, which is applied to the load. The magnitude of a load current flowing through the load is sensed and compared to a reference magnitude. An operational amplifier or other comparator in the secondary circuit generates a feedback signal in response to a difference between the sensed current magnitude and the reference magnitude. The feedback signal is applied to an optocoupler having an input stage in the secondary circuit and having an output stage in the primary circuit. The output stage of the optocoupler has a variable impedance that is incorporated into a voltage superposition circuit. The voltage superposition circuit generates a superposition voltage that is applied to an input node of a current control circuit. The current control circuit controls a frequency control current flowing from a control terminal of a switch controller integrated circuit in the DC-to-AC inverter. The superposition voltage modifies the frequency control current. The switch controller is responsive to the frequency control current to vary the frequency of the switched AC voltage. Varying the frequency of the AC voltage varies the magnitude of the load current. In some circumstances, the output stage of the optocoupler may be shorted such that the superposition voltage is maximized. The maximized superposition voltage causes a minimum control current, which results in a minimum frequency of the AC voltage. The minimum frequency of the AC voltage may cause the load current through the load to be unacceptably great.

SUMMARY

A need exists for improvements to the DC-to-DC converter to prevent the load current from exceeding an acceptable load current when the output stage of the optocoupler is shorted.

One aspect of the embodiments disclosed herein is a DC-to-AC inverter provides an AC voltage to the primary winding of an output isolation transformer having at least one secondary winding. An AC output voltage from the secondary winding is rectified to generate a DC voltage, which is applied to a load. The current flowing through the load is sensed and compared to a reference magnitude to produce a feedback signal. The feedback signal controls a voltage superposition circuit via an output stage of an optocoupler. The superposition circuit generates a superposition voltage that is applied to a current control circuit, which responds to the superposition voltage to vary a control current to a switching controller, which varies the frequency of the AC voltage to thereby vary the load current. A fault detection circuit senses a short in the output stage of the optocoupler to disable the operation of switching controller to prevent an overvoltage and an overcurrent.

Another aspect of the embodiments disclosed herein is a system for controlling a load current through a DC load. The system comprises a self-oscillating switch driver integrated circuit (IC) having a first driver output and a second driver output coupled to a first semiconductor switch and a second semiconductor switch. The switch driver IC selectively applies driver output voltages to the first and second driver outputs to enable the first and second semiconductor switches at a variable frequency to generate a switched voltage signal referenced to a primary circuit ground reference. The switch driver IC varies the variable frequency in response to a current magnitude on a control input. The switch driver IC includes a disable input terminal. The switch driver IC is responsive to an active disable input signal on the disable input terminal to discontinue applying the driver output voltages. An isolation transformer has a primary winding configured to receive the switched voltage signal. The isolation transformer has at least one secondary winding that generates a secondary AC voltage responsive to the switched voltage signal received by the primary winding. A rectifier circuit is connected to the at least one secondary winding of the isolation transformer to receive the secondary AC voltage. The rectifier circuit is configured to rectify the secondary AC voltage to provide a DC voltage to the load to produce the load current through the DC load. A current sensor senses a magnitude of the load current to generate a sensor voltage responsive to the magnitude of the load current. The magnitude of the load current is responsive to the variable frequency of the switch driver IC. A feedback generator outputs a feedback signal responsive to a difference between the sensor voltage and a reference voltage. The reference voltage represents a desired magnitude of the load current. An optocoupler has an input stage and an output stage. The input stage is coupled to receive the feedback voltage. The output stage has a variable impedance between a first output terminal and a second output terminal responsive to the feedback voltage. A current control circuit has a first resistor and a second resistor connected in series between the control input of the switch driver IC and the primary circuit ground reference. The current control circuit further includes a node between the first resistor and the second resistor. A voltage superposition circuit is connected between a supply voltage and the node of the current control circuit. The voltage superposition circuit includes the output stage of the optocoupler in series with at least one resistor. The voltage superposition circuit is responsive to the feedback voltage received by the input stage of the optocoupler to vary the impedance of the output stage to thereby vary a superposition voltage applied to the node of the current control circuit and vary the magnitude of the current on the control input of the switch driver IC. A fault detection circuit has a voltage sensor configured to sense a voltage across the output stage of the optocoupler. The fault detection circuit has an output coupled to the disable input terminal of the driver IC. The fault detection circuit is responsive to the voltage across the output stage of the optocoupler being less than a minimum magnitude to activate the disable input signal on the disable input terminal to cause the driver IC to discontinue applying voltages to the first and second driver outputs.

In certain embodiments in accordance with this aspect, the fault detection circuit comprises a first transistor. The first transistor is responsive to the voltage across the output stage of the optocoupler to conduct when the voltage across the output stage of the optocoupler is at least the minimum magnitude. The fault detection circuit further comprises a second transistor coupled to an output of the first transistor. The second transistor conducts when the first transistor conducts to deactivate the disable signal. The second transistor turns off when the first transistor is not conducting to activate the disable signal.

In certain embodiments in accordance with this aspect, the disable input terminal of the driver IC is coupled to a supply voltage via a first resistor. The disable input terminal is also coupled to a reference voltage via a second resistor and the second transistor. The disable input terminal has a first voltage when the second transistor conducts. The first voltage corresponds to an inactive disable input signal. The disable input terminal has second voltage when the second transistor is not conducting. The second voltage corresponds to an active disable input signal In certain embodiments in accordance with this aspect, the load current increases when the variable frequency decreases; and the load current decreases when the variable frequency increases.

In certain embodiments in accordance with this aspect, the voltage superposition circuit has at least a first state when the output stage of the optocoupler has a minimum impedance. The voltage superposition circuit has at least a second state when the output stage of the optocoupler has a maximum impedance. The superposition circuit applies a maximum superposition voltage to the node of the current control circuit when the superposition circuit is in the first state. The current control circuit is responsive to the maximum superposition voltage to enable a minimum current to flow out of the control input of the switch driver IC. The superposition circuit applies no superposition voltage to the node of the current control circuit when the superposition circuit is in the second state. The current control circuit is responsive to the absence of the superposition voltage to enable a maximum current to flow out of the control input of the switch driver IC.

In certain embodiments in accordance with this aspect, the switch driver IC is responsive to the minimum current flowing out of the control input to operate at a minimum variable frequency; and the switch driver IC is responsive to the maximum current flowing out of the control input to operate at a maximum variable frequency.

In certain embodiments in accordance with this aspect, the voltage superposition circuit has at least a third state when the output stage of the optocoupler has an impedance between the minimum impedance and the maximum impedance. In the third state, the superposition circuit applies a mid-range superposition voltage to the node of the current control circuit. The mid-range superposition voltage has a magnitude less than the maximum voltage. The current control circuit is responsive to the mid-range superposition voltage to enable a mid-range current to flow out of the control input of the switch driver IC. The switch driver IC is responsive to the mid-range current flowing out of the control input to operate at a mid-range frequency between the maximum variable frequency and the minimum variable frequency.

Another aspect of the embodiments disclosed herein is a method for controlling a load current through a DC load in a secondary circuit. The secondary circuit is isolated from a primary circuit by an isolation transformer. The primary circuit includes a DC-to-AC inverter. The DC-to-AC inverter includes at least a first semiconductor switch and a second semiconductor switch. The two switches are responsive to switch control signals generated by a switch controller to produce a switched input signal to a primary winding of the isolation transformer. The switch controller controls the first and second semiconductor switches at a variable operating frequency responsive to a magnitude of a control current flowing out of a control terminal of the switch controller. The control current is determined by a current control circuit. The secondary circuit includes a secondary winding of the isolation transformer coupled to an AC-to-DC rectifier. The AC-to-DC rectifier provides the load current at a magnitude responsive to the switching frequency. The method comprises sensing the load current to generate a sensed load current magnitude. The method further comprises comparing the sensed load current magnitude to a target load current magnitude. The method further comprises generating a feedback signal responsive to a difference between the sensed load current magnitude and the target load current magnitude. The method further comprises applying the feedback signal to a voltage superposition circuit via an output stage of an optical coupler to generate a superposition voltage responsive to the feedback signal. The superposition voltage is responsive to a voltage across the output stage of the optocoupler. The method further comprises applying the superposition voltage to an input node of the current control circuit to vary the control current flowing into the current control circuit from the control terminal of the switch controller to thereby vary the switching frequency of the switch controller. The method further comprises sensing the voltage across the output stage of the optocoupler and selectively generating an active disable signal applied to a disable input terminal of the switch controller when the magnitude of the voltage across the output stage of the optocoupler is less than a minimum magnitude. The switch controller is responsive to the active disable signal to discontinue generating the switch control signals to the semiconductor switches In certain embodiments in accordance with this aspect, increasing the switching frequency decreases the load current; and decreasing the switching frequency increases the load current.

In certain embodiments in accordance with this aspect, the method increases the superposition voltage when the sensed magnitude of the load current is less than the target load current magnitude; and the method decreases the superposition voltage when the sensed magnitude of the load current is greater than the target load current magnitude.

In certain embodiments in accordance with this aspect, the method further includes generating an increased superposition voltage when the sensed magnitude of the load current is less than the target load current magnitude. The method further includes applying the increased superposition voltage to the input node of the current control circuit to generate a decreased control current flowing into the current control circuit from the control terminal of the switch controller. The method further includes the switch controller reducing the switching frequency in response to the decreased control current, to thereby increase the magnitude of the load current.

In certain embodiments in accordance with this aspect, the method further includes generating a decreased superposition voltage when the sensed magnitude of the load current is greater than the target load current magnitude. The method further includes applying the decreased superposition voltage to the input node of the current control circuit to generate an increased control current flowing into the current control circuit from the control terminal of the switch controller. The method further includes the switch controller increasing the switching frequency to thereby decrease the magnitude of the load current.

Another aspect of the embodiments disclosed herein is a system for controlling the current through a DC load. The system comprises a switch controller having a first output and a second output, each output having an active state and an inactive state. The switch controller is configured to turn on only one of the outputs to the respective active state at any time. The switch controller is further configured to switch the first and second outputs at an operating frequency. The switch controller is responsive to a control current on a control input to vary the operating frequency. The switch controller has a disable input that receives a disable signal. The switch controller is responsive to an activation of the disable signal to discontinue turning on the first and second outputs. A first semiconductor switch has a control input connected to the first output of the switch controller. The first semiconductor switch has a first terminal connected to a first voltage rail and has a second terminal connected to a common switch node. A second semiconductor switch has a control input connected to the second output of the switch controller. The second semiconductor switch has a first terminal connected to the common switch node and has a second terminal connected to a second voltage rail. An isolation transformer has a primary winding AC-coupled between the common switch node and the second voltage rail. The isolation transformer has a secondary winding connected to an AC-to-DC rectifier. The AC-to-DC rectifier provides a load current that flows through the DC load. A current sensor generates a sensor signal having a magnitude responsive to a magnitude of the load current. A comparator has a first input coupled to receive the sensor signal and has a second input that receives a reference magnitude. The comparator has an output that generates a feedback signal responsive to a difference between the magnitude of the sensor signal and the reference magnitude. A current control circuit is coupled to the control input of the switch controller. The current control circuit comprises at least a first resistor in series with a second resistor between the control input and a voltage reference. The current control circuit further comprises an input node at a junction between the first resistor and the second resistor. A voltage superposition circuit has an input and an output. The output of the voltage superposition circuit is connected to the input node of the current control circuit. The input of the voltage superposition circuit is connected to the output of the comparator. The voltage superposition circuit comprises an optocoupler having an input stage coupled to the input of the voltage superposition circuit. The optocoupler has an output stage having a variable impedance responsive to the feedback signal. The output stage of the optocoupler is connected in series with at least one resistor between a supply voltage and the input node of the current control circuit to superimpose a variable voltage on the input node of the current control circuit. A fault detection circuit has a voltage sensor configured to sense a voltage across the output stage of the optocoupler. The fault detection circuit has an output coupled to the disable input of the switch controller. The fault detection circuit is responsive to the voltage across the output stage having a magnitude less than a minimum magnitude to activate the disable signal.

In certain embodiments in accordance with this aspect, the fault detection circuit comprises a first transistor having a control terminal configured to receive the voltage across the output stage of the optocoupler. The first transistor is responsive to the voltage across the output stage of the optocoupler to conduct when the voltage across the output stage of the optocoupler is at least the minimum magnitude. The fault detection circuit further includes a second transistor having a control terminal coupled to an output of the first transistor. The second transistor conducts when the first transistor conducts to deactivate the disable signal. The second transistor turns off when the first transistor is not conducting to activate the disable signal. In certain embodiments, the disable input terminal of the driver IC is coupled to a supply voltage via a first resistor. The disable input terminal is coupled to a reference voltage via a second resistor and the second transistor. The disable input terminal has a first voltage when the second transistor conducts. The first voltage corresponds to an inactive disable input signal. The disable input terminal has second voltage when the second transistor is not conducting. The second voltage corresponds to an active disable input signal.

In certain embodiments in accordance with this aspect, the load current increases when the variable frequency decreases; and the load current decreases when the variable frequency increases.

In certain embodiments in accordance with this aspect, the voltage superposition circuit has at least a first state when the output stage of the optocoupler has a minimum impedance. The voltage superposition circuit has at least a second state when the output stage of the optocoupler has a maximum impedance. The superposition circuit applies a maximum superposition voltage to the input node of the current control circuit when the superposition circuit is in the first state. The current control circuit is responsive to the maximum superposition voltage to enable a minimum current to flow out of the control input of the switch controller. The superposition circuit applies no superposition voltage to the input node of the current control circuit when the superposition circuit is in the second state. The current control circuit is responsive to the absence of the superposition voltage to enable a maximum current to flow out of the control input of the switch controller.

In certain embodiments in accordance with this aspect, the switch controller is responsive to the minimum current flowing out of the control input to operate at a minimum variable frequency. The switch controller is responsive to the maximum current flowing out of the control input to operate at a maximum variable frequency.

In certain embodiments in accordance with this aspect, the voltage superposition circuit has at least a third state when the output stage of the optocoupler has an impedance between the minimum impedance and the maximum impedance. The superposition circuit applies a mid-range superposition voltage to the node of the current control circuit. The mid-range superposition voltage has a magnitude less than the maximum voltage. The current control circuit is responsive to the mid-range superposition voltage to enable a mid-range current to flow out of the control input of the switch controller. The switch controller is responsive to the mid-range current flowing out of the control input to operate at a mid-range frequency between the maximum variable frequency and the minimum variable frequency.

BRIEF DESCRIPTIONS OF THE SEVERAL VIEWS OF THE DRAWINGS

DETAILED DESCRIPTION

Reference will now be made in detail to embodiments of the present disclosure, one or more drawings of which are set forth herein. Each drawing is provided by way of explanation of the present disclosure and is not a limitation. It will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

It is intended that the present disclosure covers such modifications and variations as come within the scope of the appended claims and their equivalents. Other objects, features, and aspects of the present disclosure are disclosed in the following detailed description. It is to be understood by one of ordinary skill in the art that the present discussion is a description of exemplary embodiments only and is not intended as limiting the broader aspects of the present disclosure.

Figure 1:
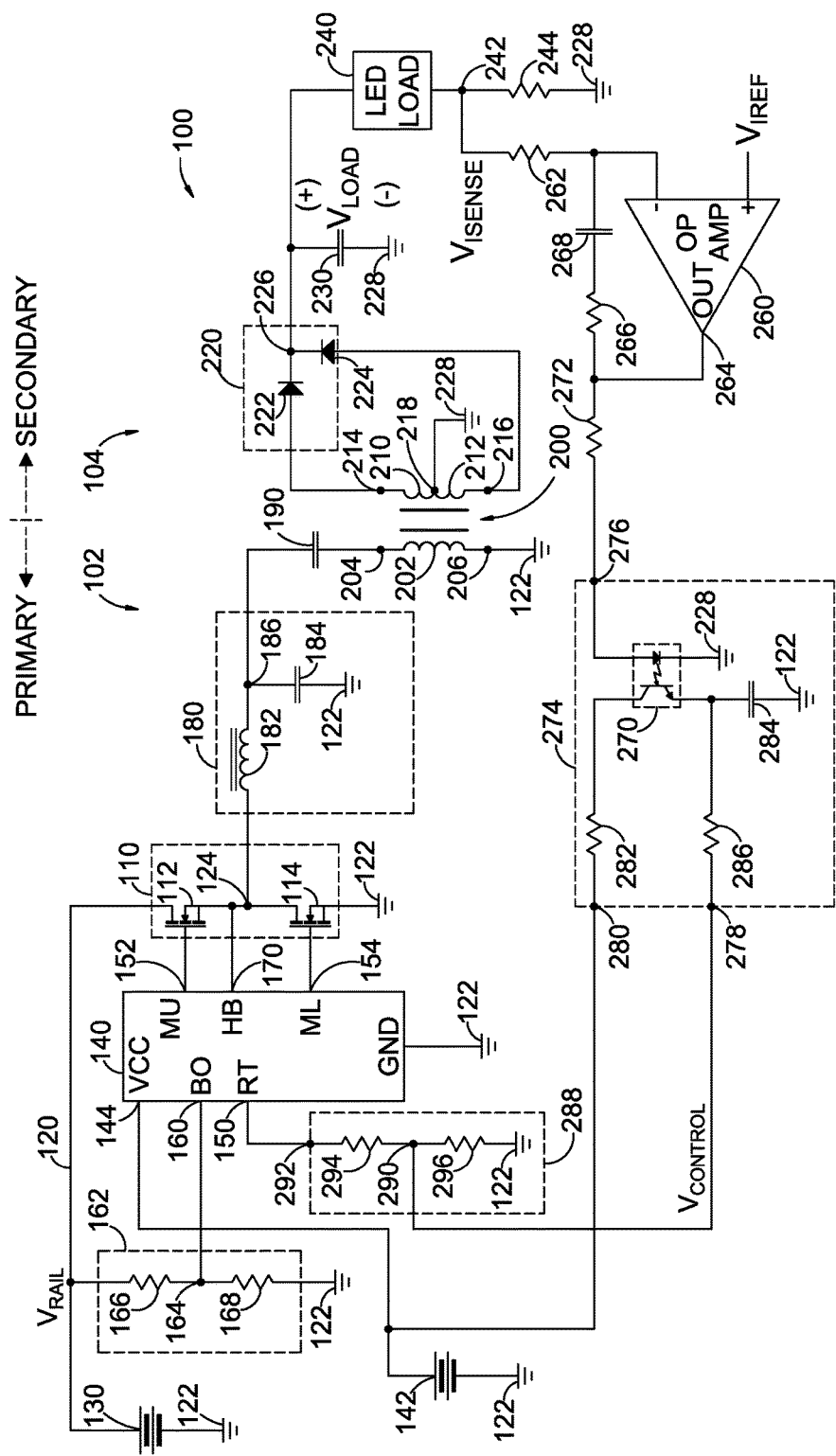
FIG. 1 illustrates a half-bridge resonant type DC-DC converter having a sensor that senses a load current in a secondary circuit and having an optocoupler that couples a feedback signal from the secondary circuit to the primary circuit.

FIG. 1 illustrates a half-bridge resonant type DC-DC converter 100, which provides a constant output current to a load. As used herein the constant output current is referenced to a reference magnitude. The reference magnitude may be varied, and the constant output current will track the reference magnitude. The illustrated converter operates over a wide range of output load currents and is stable over the range of load currents. The converter includes a primary circuit 102 and a secondary circuit 104, which are electrically isolated as described below. The converter includes a first switch 112 and a second switch 114 in a half-bridge switching circuit 110. The switches may be, for example, metal oxide semiconductor field effect transistors (MOSFETs) or bipolar junction transistors (BJTs). In the illustrated embodiment, the two switches are n-channel MOSFETs. The half-bridge switching circuit is connected between a DC input bus 120 (also labeled as $V_{RAIL}$) and a primary circuit ground reference 122. The DC input bus may be considered as a first voltage rail; and the primary circuit ground reference may be considered as a second voltage rail. The drain of the first switch is connected to the DC input bus. The source of the first switch is connected to the drain of the second switch at a common switched node 124 of the half-bridge switching circuit. The source of the second switch is connected to the primary circuit ground reference.

In the illustrated embodiment, the voltage on the DC input bus 120 is provided by a first DC voltage source 130. In the illustrated embodiment, the first DC voltage source is illustrated as a battery; however, it should be understood that the voltage on the DC input bus may be provided by other sources such as a power factor correction (PFC) stage, the DC output of a bridge rectifier, or the like, which are supplied from an AC source (not shown). The battery is representative of a variety of voltage sources that provide a substantially constant voltage on the DC input bus.

Each of the first switch 112 and the second switch 114 has a respective control input terminal. In the illustrated embodiment incorporating MOSFETs, the control input terminals are the gates of the two transistors. The control input terminals are driven by a self-oscillating half-bridge gate driver integrated circuit (IC) 140, which may also be referred to as a switch controller. In an illustrated embodiment, the driver IC (switch controller) may be, for example, an NCP1392B high-voltage half-bridge driver with inbuilt oscillator, which is commercially available from ON Semiconductor Company of Phoenix, Ariz. The driver IC is powered by a second DC voltage source 142 via a $V_{CC}$ input pin 144. In FIG. 1, the second DC voltage source is illustrated as a battery that provides a voltage $V_{CC}$; however, it should be understood that the second DC voltage source may also be derived from an AC source.

The driver IC (switch controller) 140 is responsive to a timing resistance connected to a timing terminal (RT) 150 to alternately apply an upper drive voltage on an upper drive terminal (MU) 152 and apply a lower drive voltage on a lower drive terminal (ML) 154. The upper output drive voltage is applied to the control input terminal of the first switch 112. The lower output drive voltage is applied to the control input terminal of the second switch 114. When the resistance applied to the timing terminal of the driver IC increases, the current flowing out of the timing terminal decreases, which causes the frequency of the drive voltages applied to the two switches to decrease. When the resistance applied to the timing terminal of the driver IC decreases, the current flowing out of the timing terminal increases, which causes the frequency of the drive voltages to increase.

The driver IC 140 further includes a brownout (BO) input terminal 160. The brownout input terminal is connected to an output node 164 of a brownout detection circuit 162. The brownout control circuit includes a first brownout detection resistor 166 having a first terminal connected to the DC input bus 120 and having a second terminal connected to the output node. The brownout circuit further includes a second brownout detection resistor 168 having a first terminal connected to the output node and having a second terminal connected the primary circuit ground reference 122. The two brownout resistors comprise a voltage divider circuit configured to produce a voltage on the output node that is maintained in a working range of approximately 1 volt to approximately 2 volts when the voltage on the DC input bus has a nominal voltage (e.g., approximately 350 volts in one embodiment). If the voltage on the output node decreases below a lower limit of 1 volt or increases above an upper limit of 2 volts, the driver IC is responsive to the out-of-range voltage to stop applying the upper drive voltage on the upper drive terminal (MU) 152 and to stop applying the lower drive voltage on the lower drive terminal (ML) 154. Thus, the first the first switch 112 and the second switch 114 are both turned off until the voltage on the DC input bus returns to a voltage within the normal operating range.

As described herein, the voltage on the brownout detection circuit output node 164 may also be referred to as a disable input signal to the brownout (BO) input terminal 160 of the driver IC 140. The disable input signal is active when the voltage on the brownout detection circuit output node is below approximately 1 volt or is above approximately 2 volts. The disable input signal is inactive when the voltage on the brownout detection circuit output node is in the normal operating range between approximately 1 volt and approximately 2 volts.

The common switched node 124 of the half-bridge switching circuit 110 is connected to a half-bridge connection terminal (HB) 170 of the driver IC 140. The common switched node is also connected to a first terminal of a resonant inductor 182 in a resonant circuit 180. A second terminal of the resonant inductor is connected to a first terminal of a resonant capacitor 184 at an output node 186 in the resonant circuit. A second terminal of the resonant capacitor is connected to the primary circuit ground reference 122. The resonant inductor and the resonant capacitor are the main resonant components of the resonant circuit, which is driven by the alternatingly connecting the common switched node to the DC bus 120 via the first switch 112 and to the primary circuit ground reference via the second switch 114.

The output node 186 of the resonant circuit 180 is connected to a first terminal of a DC blocking capacitor 190. A second terminal of the DC blocking capacitor is connected to a first terminal 204 of a primary winding 202 of an output isolation transformer 200. A second terminal 206 of the primary winding of the output isolation transformer is connected to the primary circuit ground reference 122. The foregoing components on the primary circuit 102 of the half-bridge switching circuit 110 operate as a DC-to-AC inverter to produce an AC voltage across the primary winding of the output isolation transformer.

The output isolation transformer 200 includes a first secondary winding 210 and a second secondary winding 212. The two secondary windings are electrically isolated from the primary winding 202. As illustrated, the primary winding is electrically part of the primary circuit 102, and the secondary windings are electrically part of the secondary circuit 104. The two secondary windings have respective first terminals, which are connected at a center tap 218. Respective second terminals 214, 216 of the first and second secondary windings are connected to input terminals of a half-bridge rectifier 220. The half-bridge rectifier comprises a first rectifier diode 222 and a second rectifier diode 224. The second terminal of the first secondary winding is connected to the anode of the first rectifier diode. The second terminal of the second secondary winding is connected to the anode of the second rectifier diode. The cathodes of the two rectifier diodes are connected together at an output node 226 of the half-bridge rectifier. The center tap of the first and second secondary windings is connected to a secondary circuit ground reference 228. In other embodiments having a single, non-center-tapped secondary winding, the half-bridge rectifier with the two rectifier diodes may be replaced with a full-bridge rectifier with four rectifier diodes.

The output node 226 of the half-bridge rectifier 220 is connected to a first terminal of an output filter capacitor 230. A second terminal of the output filter capacitor is connected to the secondary circuit ground reference 228. A load voltage ($V_{LOAD}$) is developed across the output filter capacitor at the output node of the half-bridge rectifier. The output node of the half-bridge rectifier is also connected to a first terminal of a load 240, which may comprise, for example, one or more light-emitting diodes (LEDs) that emit light when sufficient current passes through the LEDs. A second terminal of the load is connected to a current sensing node 242 and to the first terminal of a current sensing resistor 244. A second terminal of the current sensing resistor is connected to the secondary circuit ground reference. When current flows through the load, the same current flows through the current sensing resistor. Accordingly, a voltage develops on the current sensing terminal that has a magnitude with respect to the secondary circuit ground reference that is proportional to the current flowing through the load. In one embodiment, the current sensing resistor has a resistance of, for example, 0.1 ohm (0.1Ω) such that the effect of the resistance of the current sensing resistor on the load current is insignificant.

When the driver IC 140 operates to apply alternating drive voltages to the first switch 112 and the second switch 114, an AC voltage develops across the resonant capacitor 184. The voltage across the resonant capacitor may include a DC component; however, the DC blocking capacitor 190 transfers only the AC component of the energy stored in the resonant capacitor to the primary winding 202 of the output isolation transformer 200. The transferred energy is magnetically coupled from the primary winding to the electrically isolated first and second secondary windings 210, 212. The first and second rectifier diodes 222, 224 in the half-bridge rectifier 220 rectify the AC energy from the secondary windings into DC energy, which is provided on the output node 226. The DC energy is stored in the output filter capacitor 230 at a voltage determined by the amount of stored energy. Current from the output filter capacitor is provided to the load 240 at a magnitude determined by the voltage on the half-bridge rectifier output node and the resistance of the load.

The illustrated driver IC 140 has a fixed deadtime between turning off one of the switched outputs and turning on the other of the switched outputs. The fixed deadtime causes the duty cycle of the on-time of each of the first and second switches 112, 114 to decrease with increased frequency and to increase with decreased frequency. A decrease in duty cycle causes the energy transferred to the load to decrease. An increase in duty cycle causes the energy transferred to the load to increase. Thus, the load current decreases with increased switching frequency, and the load current increases with decreased switching frequency.

Because the intensity of the light emitted by the LEDs in the load 240 is dependent on the magnitude of the current flowing through the LEDs, the current is controlled closely. The current sensing resistor 244 senses the current going through the load and develops a voltage $V_{ISENSE}$ on the current sensing node 242 proportional to the load current. The voltage representing the sensed current is fed back to a proportional integral (PI) current control loop to provide current regulation. In FIG. 1, the PI current control loop includes an operational amplifier (OPAMP) 260 having an inverting (−) input terminal, having a non-inverting (+) input terminal, and having an output (OUT) on an output terminal 264. The current sensing node is connected to the inverting input of the operational amplifier via a series resistor 262. A feedback resistor 266 and a feedback capacitor 268 are connected in series between the output terminal of the operational amplifier and the inverting input. A reference voltage ($V_{IREF}$) having a magnitude corresponding to a reference current ($I_{REF}$) is connected to the non-inverting input of the operational amplifier. The magnitude of the reference current and thus the magnitude of the reference voltage are selected to produce a desired load current through the load. The reference current may be a fixed reference current to provide a constant load current, or the reference current may be a variable reference current to allow the load current to be varied to thereby change the intensity of the light emitted by the LEDs in the load. As indicated above, the load current is maintained constant relative to the reference current. If the reference current changes to a new magnitude, the load current is maintained constant relative to the new magnitude. The operational amplifier is responsive to a difference in the magnitudes of the reference voltage $V_{IREF}$ and the sensed voltage $V_{ISENSE}$ to generate a feedback signal. The feedback signal is used to control the operational frequency of the driver IC 140 as described below. The operational amplifier may also be considered as a comparator because the operational amplifier compares the magnitudes of the two input signals and generates an output signal having a magnitude responsive to a difference between the magnitudes of the two input signals.

The output terminal 264 of the operational amplifier 260 is connected to the input stage of an optocoupler 270 via a series resistor 272. The optocoupler may also be referred to as an opto-isolator, an optical isolator or a photocoupler. The input stage of the optocoupler has an internal light generation device (e.g., an LED) coupled to the input of the optocoupler. The input voltage is applied to the anode of the LED. The light generation device is responsive to a voltage applied to the input stage to generate light. The applied voltage is referenced to the secondary circuit ground reference 228 to which the cathode of the LED in the light generation stage is connected. The generated light is propagated internally to a light-responsive base of a phototransistor in an output stage within the same component. The phototransistor has an emitter and a collector. The impedance of the phototransistor between the collector and the emitter in the output stage of the optocoupler is responsive to the light generated by the input stage. Thus, the impedance of the output stage is responsive to the voltage applied to the input stage. In the illustrated embodiment, increasing the voltage applied to the input stage decreases the impedance of the output stage, and decreasing the voltage applied to the input stage increases the impedance of the output stage. The optocoupler electrically isolates the secondary circuit voltages and the secondary circuit ground reference in the secondary circuit 104 from the primary circuit voltages and the primary circuit ground reference in the primary circuit 102.

The optocoupler 270 operates as the input stage of a voltage superposition circuit 274, which has an input terminal 276 corresponding to the input (e.g., the LED anode) of the input stage of the optocoupler. The voltage superposition circuit also has an output terminal 278 and a voltage source terminal 280. The voltage source terminal is connected to the second DC voltage source 142. The collector of the phototransistor in the output stage of the optocoupler is connected to the voltage source terminal via a pullup resistor 282. The emitter of the phototransistor is connected to the primary circuit ground reference 122 via a filter capacitor 284. The emitter of the phototransistor is also connected to the output terminal of the voltage superposition circuit via a voltage superposition output resistor 286.

The voltage superposition circuit 274 provides a series impedance between the voltage source terminal 280 and the voltage superposition circuit output terminal 278 that is the sum of a resistance $R_{282}$ of the pullup resistor 282, a resistance $R_{286}$ of the output resistor 286 and an impedance $R_{270}$ of the output stage of the optocoupler 270.

The voltage superposition circuit output terminal 278 is connected to an input node 290 of a current control circuit 288. The current control circuit has an output node 292. The current control circuit comprises a first current control resistor 294 connected between the current control circuit output node and the current control circuit input node. The current control circuit further comprises a second current control resistor 296 connected between the current control circuit input node and the primary circuit ground reference 122. The current control circuit output node is connected to the timing terminal (RT) 150 of the driver IC 140.

The impedance of the series combination of the first current control resistor 294 and the second current control resistor 296 in the current control circuit 288 operates as the primary impedance to control the current flowing from the timing terminal (RT) 150 of the driver IC 140 and to thereby control the operating frequency of the driver IC. The voltage superposition 274 operates to apply a superposition voltage (also referred to herein as a control voltage $V_{CONTROL}$) to the input node 290 of the current control circuit to vary current flow and thereby vary the operating frequency of the driver IC in response to the feedback from the secondary circuit 104. As described below, the magnitude of the superposition voltage is determined in part by the series impedance between the voltage source terminal 280 and the voltage superposition circuit output terminal 278 of the voltage superposition output resistor 286. The series resistance connects the second DC voltage source 142 to the current control circuit input node.

When the current through the current sensing resistor 244 generates a voltage $V_{ISENSE}$ that is less than the voltage $V_{IREF}$ corresponding to the reference current $I_{REF}$, the output voltage of the operational amplifier 260 increases. The increased output voltage produced by the operational amplifier causes the optocoupler 270 to increase the light generated between the input stage and the output stage, which causes the phototransistor in the output stage to increase conductivity and thus decrease the effective impedance of the output stage. The decreased impedance of the output stage of the optocoupler causes the superposition voltage $V_{CONTROL}$ on the output terminal 278 of the voltage superposition circuit 274 to increase. As described in more detail below, the increased superposition voltage applied to the current control circuit input node 290 causes the timing control current $I_{RT}$ flowing out of the timing terminal (RT) 150 of the driver IC 140 to decrease. The decreased timing control current decreases the switching frequency of the driver IC, which increases the duty cycle of each switching voltage applied to the respective control input terminals of the first switch 112 and the second switch 114. The increased duty cycle increases the energy transferred to the output filter capacitor 230. The increased energy transfer increases the voltage on the output node 226, which increases the current flowing through the load.

When the current flowing through the load is greater than the reference current, the opposite transitions occur. The voltage on the output of the operational amplifier 260 decreases. The effective impedance of the output stage (phototransistor) of the optocoupler 270 increases to cause the superposition voltage $V_{CONTROL}$ on the output terminal 278 of the voltage superposition circuit 274 to decrease. The decreased superposition voltage increases the timing control current $I_{RT}$ flowing out of the timing terminal (RT) 150 of the driver IC 140. The increased timing control current increases the switching frequency of the driver IC, which decreases the duty cycle of each switching voltage applied to the respective control input terminals of the first switch 112 and the second switch 114. The decreased duty cycle decreases the energy transferred to the output filter capacitor 230. The decreased energy transfer decreases the voltage on the output node 226, which decreases the current flowing through the load.

As described above, the feedback from the secondary circuit 104 to the primary circuit 102 via the current sensing resistor 244, the operational amplifier 260, the voltage superposition circuit 274 and the current control circuit 288 forms a proportional-integral (PI) loop that maintains the magnitude of the load current substantially equal to the magnitude of the reference current by decreasing the operating frequency to increase the load current when the sensed current is too low and by increasing the operating frequency to decrease the load current when the sensed current is too high.

The operating frequency $f_{OP}$ of the driver IC 140 is proportional to the current flowing out of the timing terminal (RT) 150 as follows:

$$f_{OP} = \frac{V_{REF}}{R_{RT}} \times K = K \times I_{RT} \quad (1)$$

In Equation (1), K is a constant. $V_{REF}$ is an internal voltage reference within the driver IC 140, which in the illustrated embodiment is approximately 3.5 volts. $R_{RT}$ is the effective total resistance connected between the timing terminal (RT) 150 and the primary circuit ground reference 122. Accordingly, $I_{RT}$ is the timing control current flowing through the effective total resistance $R_{RT}$.

The timing current $I_{RT}$ flowing from the timing terminal (RT) 150 is determined by the voltage across the first current control resistor 294 in the current control circuit 288. The voltage across the first current control resistor is the difference between the internal reference voltage $V_{REF}$ generated within the driver IC 140 and the superposition voltage $V_{CONTROL}$ from the voltage superposition circuit 274 applied to the timing control circuit input node 290. Thus, the timing current is calculated as follows:

$$I_{RT} = \frac{V_{REF} - V_{CONTROL}}{R_{294}} \quad (2)$$

In Equation (2), $R_{294}$ is the resistance of the first current control resistor 294. In the illustrated embodiment, $V_{REF}$ has a magnitude of approximately 3.5 volts. As shown in Equation (2), the timing control current $I_{RT}$ is adjustable by changing the superposition voltage $V_{CONTROL}$ across the second current control resistor 296 with respect to the primary circuit ground reference 122. The voltage superposition circuit 274 controls the superposition (control) voltage $V_{CONTROL}$ on the current control circuit input node in the following manner.

The control voltage $V_{CONTROL}$ is defined using the superposition principal as follows:

$$V_{CONTROL} = \left[ V_{CC} \times \frac{\frac{R_{294} \times R_{296}}{R_{294} + R_{296}}}{R_{282} + R_{270} + R_{286} + \frac{R_{294} \times R_{296}}{R_{294} + R_{296}}} \right] + \left[ V_{REF} \times \frac{R_{296}}{R_{294} + R_{296}} \right] \quad (3)$$

Substituting Equation (3) for $V_{CONTROL}$ in Equation (1) results in the following:

$$f_{OP} = \quad (4)$$

$$K \times I_{RT} = K \times \frac{V_{REF} - \left[ V_{CC} \times \frac{\frac{R_{294} \times R_{296}}{R_{294} + R_{296}}}{R_{332} + R_{270} + R_{334} + \frac{R_{294} \times R_{296}}{R_{294} + R_{296}}} \right] - \left[ V_{REF} \times \frac{R_{296}}{R_{294} + R_{296}} \right]}{R_{294}}$$

As shown in Equations (3) and (4), when the output impedance $R_{270}$ of the output stage of the optocoupler 270 increases, the superposition voltage $V_{CONTROL}$ at the input node 290 of the timing control circuit 288 decreases. The decreased node voltage causes the timing control current $I_{RT}$ to increase. The increased timing control current causes the operating frequency $f_{OP}$ to increase. As discussed above, the output impedance of the output stage of the optocoupler increases when the voltage applied to the input stage of the optocoupler decreases as a result of the load current $I_{LOAD}$ being too high as a result of the operating frequency being too low. Thus, the voltage superposition circuit operates to increase the operating frequency to thereby decrease the load current. When the optocoupler is fully off, the output impedance $R_{270}$ is very large, and the superposition voltage $V_{CONTROL}$ is effectively 0 volts. When the superposition voltage $V_{CONTROL}$ is 0 volts, the timing control current $I_{RT}$ has a maximum magnitude, which results in a maximum operating frequency $f_{OP\_MAX}$. In particular, the maximum operating frequency can be determined by replacing the control voltage $V_{CONTROL}$ represented by the middle term of the right side of Equation (4) with zero and combining the remaining terms to obtain the following:

$$f_{OP} = K \times I_{RT} = K \times \frac{V_{REF}}{R_{294} + R_{296}} \quad (5)$$

In one embodiment, the first current control resistor 294 has a resistance $R_{294}$ of approximately 2,000 ohms (2 kΩ), and the second current control resistor 296 has a resistance $R_{296}$ of approximately 2,700 ohms (2.7 kΩ). The value of K for the driver IC 140 is approximately 250×10$^6$, and the internal reference voltage $V_{REF}$ of the driver IC is approximately 3.5 volts. For this example, the maximum operating frequency $f_{OP\_MAX}$ is approximately 186 kHz.

As shown in Equations (3) and (4), when the optocoupler 270 is turned on, the output impedance $R_{270}$ of the output stage of the optocoupler decreases such that the control voltage $V_{CONTROL}$ represented by the middle term of the right side of Equation (4) is no longer zero. As the output impedance of the optical coupler decreases the control voltage increases, the timing control current $I_{RT}$ decreases, and the operating frequency $f_{OP}$ decreases. When the optocoupler is fully turned on, the output impedance $R_{270}$ is very small (e.g., around 100 ohms (100Ω) or less) in comparison to the fixed resistances $R_{282}$ and $R_{286}$ such that the superposition voltage $V_{CONTROL}$ has a maximum magnitude. When the superposition voltage $V_{CONTROL}$ has a maximum magnitude, the timing control current $I_{RT}$ has a minimum magnitude, which results in a minimum operating frequency $f_{OP\_MIN}$. In one embodiment, the pullup resistor 282 in the voltage superposition circuit 274 has a resistance $R_{282}$ of approximately 4,500 ohms (4.5 kΩ), and the output resistor 286 in the voltage superposition circuit has a resistance of approximately 5,000 ohms (5 kΩ). With the previous approximate values for the first current control resistor 294, the second current control resistor 296 and K, the minimum operating frequency is approximately 119 kHz, which is above a resonant frequency $f_{OP\_RES}$ for the resonant circuit 180.

The effect of the superposition circuit on the overall operation of the PI loop can be understood as follows. When the voltage on the output terminal 264 of the operational amplifier increases in response to the sensed load current being less than the reference current, the current flowing into the light-emitting diode of the input stage of the optocoupler 270 increases. The increased input current causes the output impedance $R_{270}$ of the output stage of the optocoupler to decrease. According to Equation (4), the decreased output impedance of the optocoupler causes the control voltage $V_{CONTROL}$ represented by the middle term of the right side of Equation (4) to increase (have a greater magnitude). Subtracting the greater magnitude from $V_{REF}$ decreases the right side of Equation (4). Thus, the operating frequency $f_{OP}$ decreases. As discussed above, decreasing the operating frequency increases the energy transfer to thereby increase the load current $I_{LOAD}$.

When the voltage on the output terminal 264 of the operational amplifier decreases in response to the sensed load current being greater than the reference current, the current flowing into the light-emitting diode of the input stage of the optocoupler 270 decreases. The decreased input current causes the output impedance $R_{270}$ of the output stage of the optocoupler to increase. According to Equation (4), the increased output impedance of the optocoupler causes the control voltage $V_{CONTROL}$ represented by the middle term of the right side of Equation (4) to decrease (have a smaller magnitude). Subtracting the smaller magnitude from $V_{REF}$ increases the right side of Equation (4). Thus, the operating frequency $f_{OP}$ increases. As discussed above, increasing the operating frequency decreases the energy transfer to thereby decrease the load current $I_{LOAD}$.

Figure 2:
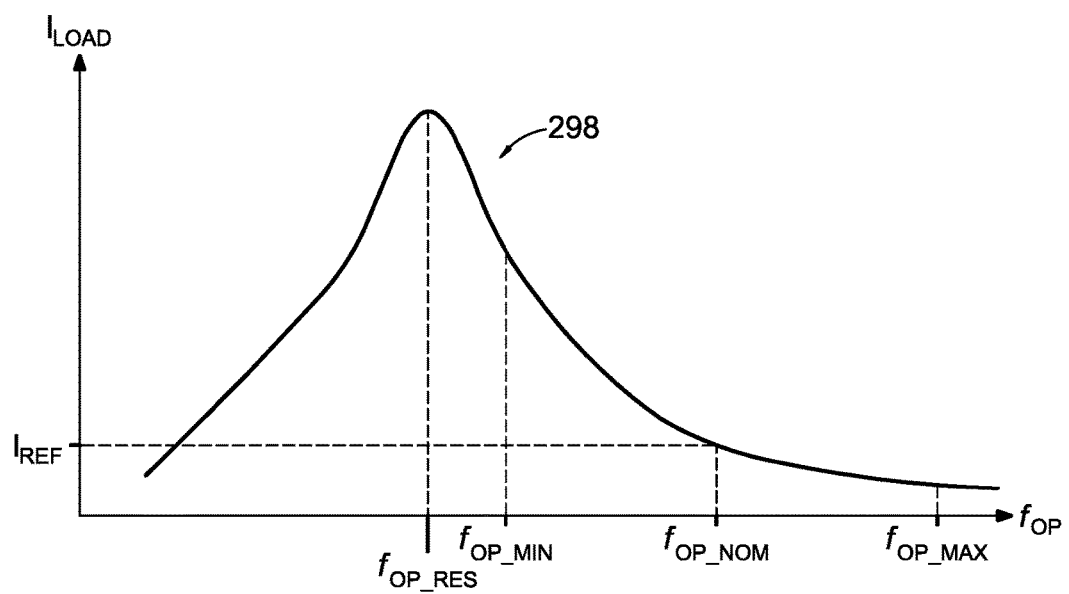
FIG. 2 illustrates a graph of the load current $I_{LOAD}$ versus the operating frequency $f_{OP}$ of the half-bridge resonant type DC-DC converter of FIG. 1.

The relationship of the operating frequency $f_{OP}$ and the current $I_{LOAD}$ through the load 240 is illustrated by a graph 298 in FIG. 2. The operating frequency varies between the minimum operating frequency ($f_{OP\_MIN}$) and the maximum operating frequency ($f_{OP\_MAX}$). As indicated above, the minimum operating frequency is greater than the resonant frequency ($f_{OP\_RES}$) of the resonant circuit 180. The operating frequency of the driver IC 140 increases as the load current decreases, and the operating frequency decreases as the load current increases. For example, in one embodiment, the DC-to-DC converter 100 of FIG. 1 is configured to operate at a minimum operating frequency ($f_{OP\_MIN}$) of about 119 kHz at a maximum load current and to operate at a maximum operating frequency ($f_{OP\_MAX}$) of approximately 186 kHz at a minimum load current.

The modified half-bridge resonant type DC-DC converter 100 of FIG. 1 is generally insensitive to small changes of the output impedance of the output stage of the optocoupler such that subtle differences in the output impedance between optocouplers or subtle changes in output impedance over time will not affect the minimum operating frequency $f_{OP\_MIN}$.

In the illustrated embodiment, the filter capacitor 284 in the voltage superposition circuit 274 has a capacitance of around 1 microfarad. The filter capacitor operates to further stabilize the control voltage $V_{CONTROL}$ applied to the input node 290 of the current control circuit 288 and to further reduce the sensitivity of the current control circuit to noise and to subtle changes in the output impedance $R_{270}$ of the output stage of the optocoupler 270.

As shown in FIG. 2, the load current $I_{LOAD}$ is very high when the operating frequency $f_{OP}$ is close to the resonant frequency of the resonant circuit 180. Operating at or near the resonant frequency is not desirable. Thus, the components of the current control circuit 288 and the voltage superposition circuit 274 are selected such that the DC-DC converter 100 operates over a range of load currents and operating frequencies that are displaced away from the resonant frequency $f_{RES}$. For example, in one embodiment, a nominal operating frequency $f_{OP\_NOM}$ is selected such that the nominal operating frequency is midway between the minimum operating frequency $f_{OP\_MIN}$ and the maximum operating frequency $f_{OP\_MAX}$ to provide a target load current corresponding to the reference current $I_{REF}$. Small variations in the operating frequency near the nominal reference frequency result in small changes in the load current that do not approach the load current at the resonant frequency.

If a fault (e.g., a short) occurs in the output stage of the optocoupler 270 such that the output impedance $R_{270}$ of the optocoupler is at or near zero ohms (0Ω), the operating frequency of the driver IC 140 will be at the minimum operating frequency $f_{OP\_MIN}$. The magnitude of the load current $I_{LOAD}$ and the magnitude of the load voltage $V_{LOAD}$ at the minimum operating frequency will be quite high. In order to obtain Underwriters Laboratory (UL) certification as a Class II power supply, the load voltage cannot exceed 60 volts for more than 200 milliseconds, and the corresponding load current cannot exceed 8 amperes when a component fault occurs. Since the load voltage and load current of the DC-DC converter 100 of FIG. 1 may exceed those limits if the output stage of the optocoupler is shorted (e.g., during a component fault test), a need exists for a protection circuit to prevent the excessive voltage and current.

Figure 3:
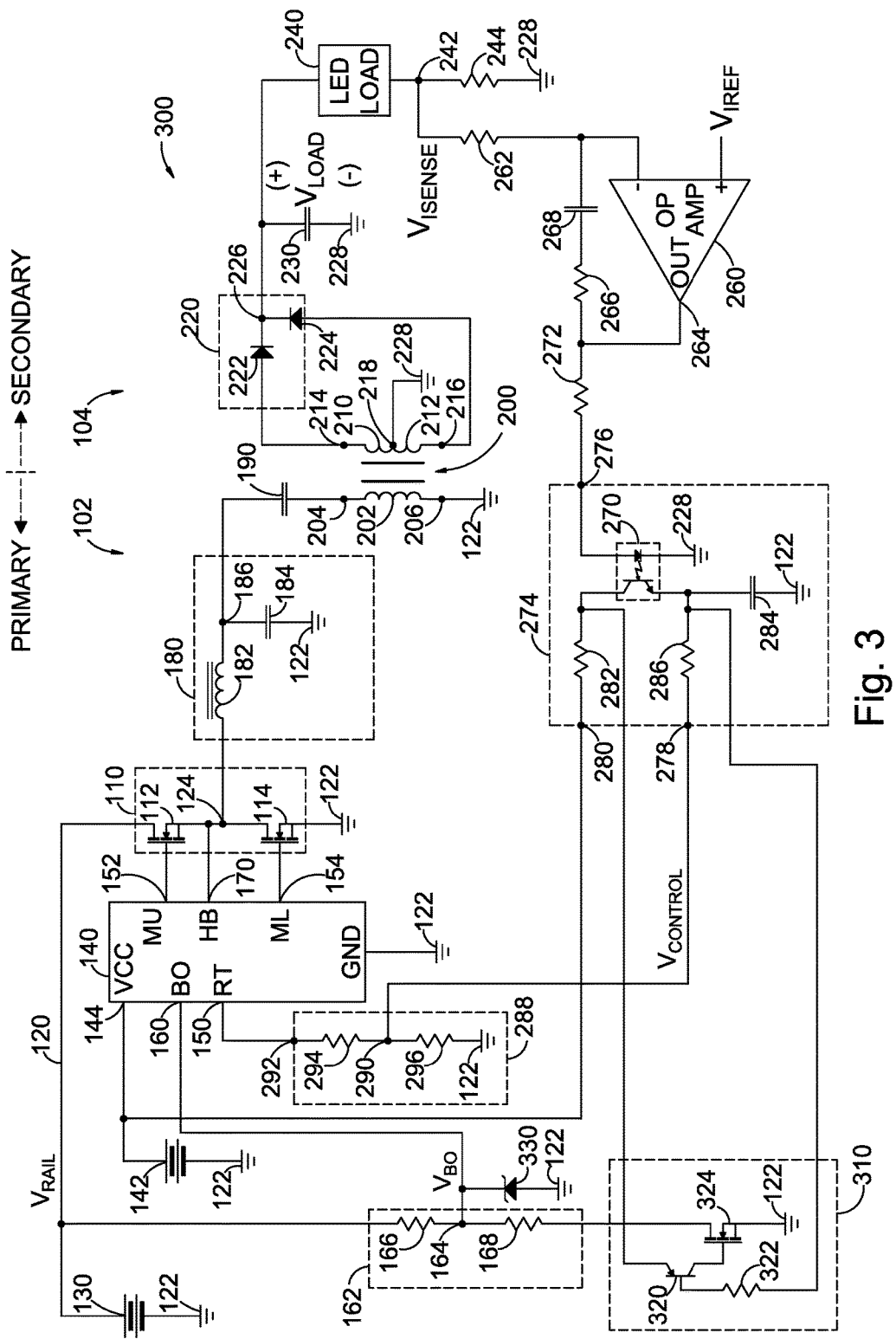
FIG. 3 illustrates a modified half-bridge resonant type DC-DC converter, which includes a voltage superposition block to control the operating frequency of a driver IC in the primary circuit of the DC-DC converter.

FIG. 3 illustrates a modified half-bridge resonant type DC-DC converter 300, which corresponds to the half-bridge resonant type DC-DC converter 100 of FIG. 1 except that a fault detection circuit 310 is included to prevent an excessive load current $I_{LOAD}$ and an excessive load voltage $V_{LOAD}$ when the output stage of the optocoupler 270 in the voltage superposition circuit 274 is shorted. As described below, rather than the driver IC 140 operating at the minimum operating frequency $f_{OP\_MIN}$ when the fault condition occurs, the fault detection circuit causes the driver IC to discontinue switching until the fault condition is eliminated.

The modified half-bridge resonant type DC-DC converter 300 of FIG. 3 has components corresponding to the components of the half-bridge resonant type DC-DC converter 100 of FIG. 1; and the components in FIG. 3 operate in a corresponding manner as the components in FIG. 1. In particular, in the absence of a fault condition on the output stage of the optocoupler 270, the previous operational description applies.

The fault detection circuit 310 includes a PNP bipolar transistor 320, a base resistor 322 and an n-channel MOSFET fault switch 324. The emitter of the PNP bipolar transistor is connected to the collector of the optocoupler 270 and is thus connected to the pullup resistor 282 in the voltage superposition circuit 274. The base of the PNP bipolar transistor is connected to the emitter of the optocoupler via the base resistor. The collector of the PNP bipolar transistor is connected to the gate terminal of the MOSFET fault switch. The source of the MOSFET fault switch is connected to the primary circuit ground reference 122. In the embodiment of FIG. 3, the second terminal of the second brownout resistor 168 in the brownout circuit 162 is no longer connected directly to the primary circuit ground reference. Rather, the second terminal of the second brownout resistor is connected to the drain of the MOSFET fault switch. As described below, when the MOSFET fault switch is closed (e.g., conducting), the second terminal of the second brownout resistor is connected to the primary circuit ground reference. When the MOSFET fault switch is open (e.g., not conducting), the second terminal of the second brownout resistor is disconnected from the primary circuit ground reference.

The modified half-bridge resonant type DC-DC converter 300 of FIG. 3 is further modified with respect to the half-bridge resonant type DC-DC converter 100 of FIG. 1 by connecting a Zener diode 330 between the brownout circuit output node 164 and primary circuit ground reference 122. The anode of the Zener diode is connected to the brownout circuit output node, and the cathode of the Zener diode is connected to the primary circuit ground reference. The Zener diode has a clamping voltage greater than 2 volts (e.g., 3 volts) to prevent the disable signal on the brownout (BO) input terminal 160 from exceeding a maximum safe voltage on the input terminal.

When the output stage of the optocoupler 270 is operating normally such that the output impedance $R_{270}$ is varying in response to the voltage applied to the input stage, the voltage across the output stage between the collector and the emitter will be greater than 1 volt. This voltage applied across the emitter-base junction of the PNP bipolar transistor 320 will be greater than the turn-on threshold of the PNP bipolar transistor, which is typically about 0.7 volt. Accordingly, the PNP bipolar transistor will always be on during normal operating conditions. The voltage on the collector the PNP bipolar transistor is sufficient to turn on the MOSFET fault switch 324. Thus, during normal operating conditions, the second terminal of the second brownout resistor 168 is effectively connected to the primary circuit ground reference 122. The voltage (disable input signal) on the brownout circuit output node 164 is maintained between 1 volt and 2 volts such that the driver IC 140 operates as described above.

If the output stage of the optocoupler 270 is shorted during a fault test or during actual operation of the modified half-bridge resonant type DC-DC converter 300, the voltage across the output stage of the optocoupler will be 0 volts, which is insufficient to keep the PNP bipolar transistor 320 on. When the PNP bipolar transistor turns off, the voltage on the gate terminal of the MOSFET fault switch is insufficient to keep the MOSFET fault switch on. Thus, the second terminal of the second brownout resistor 168 is effectively disconnected from the primary circuit ground reference 122. The voltage (disable input signal) on the brownout circuit output node 164 will increase to a magnitude limited by the clamping voltage of the Zener diode 330 (e.g., limited to 3 volts). The increased voltage of the disable input signal on the brownout circuit output node exceeds the upper threshold (e.g., 2 volts) of the input voltage to the brownout (BO) input terminal 160 of driver IC 140 and the disable input signal becomes active. The driver IC is responsive to the active disable input signal on the brownout input terminal to stop switching the upper drive voltage on the upper drive terminal (MU) 152 and the lower drive voltage on a lower drive terminal (ML) 154. Accordingly, no switching voltage is provided on the common switched node 124 of the half-bridge switching circuit 110. Both the load current $I_{LOAD}$ and the load voltage $V_{LOAD}$ drop rapidly to respective zero magnitudes as the output filter capacitor 230 discharges. Thus, the fault detection circuit 320 prevents over-voltage and over-current from occurring when a short is imposed on the output stage of the optocoupler.

If the output stage of the optocoupler 270 remains shorted, the voltage on the brownout input terminal 160 of the driver IC continues to remain above 2 volts, and the driver IC will not restart. If the fault (e.g., short) on the output stage of the optocoupler clears, the PNP bipolar transistor 320 and the MOSFET fault switch 324 will both turn on to return the voltage of the disable input signal on the brownout input terminal to a magnitude between 1 volt and 2 volts. The disable input signal will become inactive, and the driver IC will resume operation and generate the upper and lower drive voltages as before.

Figure 4A:
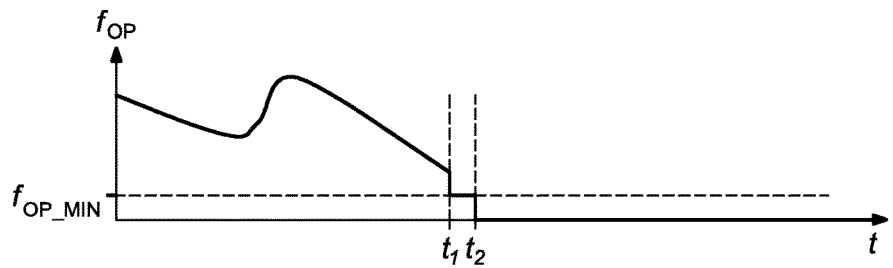
FIG. 4A illustrates the operating frequency $f_{OP}$ of the driver IC over time.
Figure 4B:
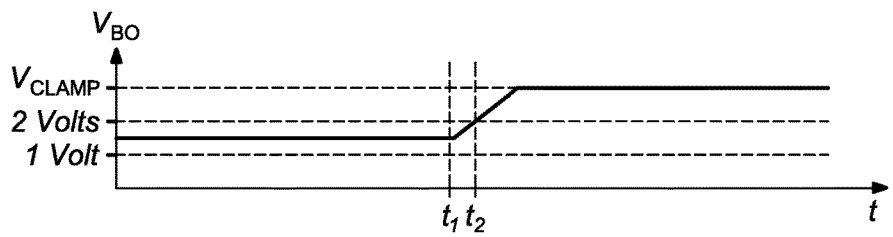
FIG. 4B illustrates the input voltage $V_{BO}$ on the brownout (BO) input terminal of the driver IC over a corresponding time scale as in FIG. 4A.
Figure 4C:
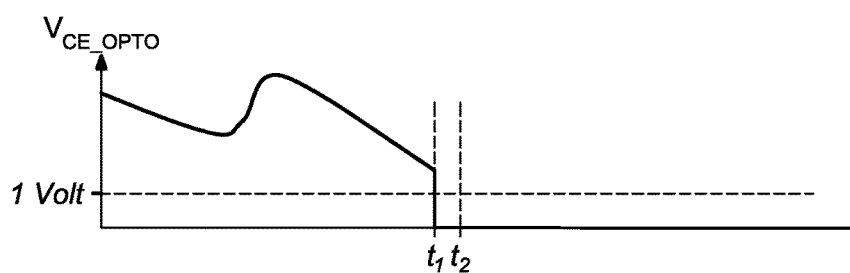
FIG. 4C illustrates the collector-emitter voltage $V_{CE\_OPTO}$ across the output stage of the optocoupler over a corresponding time scale as in FIG. 4A.
Figure 4D:
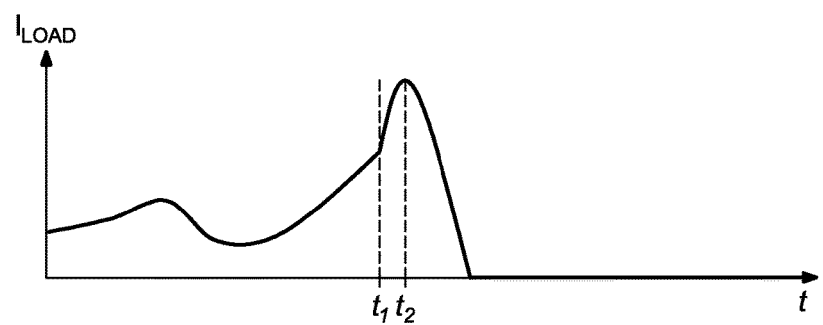
FIG. 4D illustrates the magnitude of the load current $I_{LOAD}$ over a corresponding time scale as in FIG. 4A.
Figure 4E:
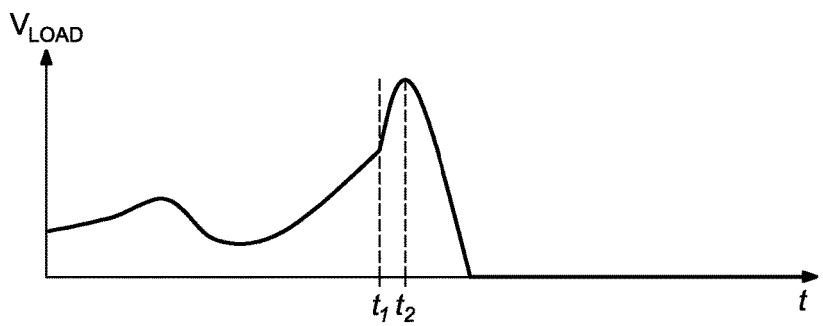
FIG. 4E illustrates the load voltage $V_{LOAD}$ over a corresponding time scale as in FIG. 4A.

The foregoing is illustrated in FIGS. 4A, 4B, 4C, 4D and 4E. FIG. 4A illustrates the operating frequency $f_{OP}$ of the driver IC 140 over time. FIG. 4B illustrates the input voltage $V_{BO}$ on the brownout (BO) input terminal 160 over a corresponding time scale. FIG. 4C illustrates the collector-emitter voltage $V_{CE\_OPTO}$ across the output stage of the optocoupler 270 over a corresponding time scale. FIG. 4D illustrates the magnitude of the load current $I_{LOAD}$ over a corresponding time scale. FIG. 4E illustrates the load voltage $V_{LOAD}$ over a corresponding time scale. As shown in FIG. 4A, prior to a time $t_1$, the operating frequency may vary as shown in response to changes in the load current and the load voltage; however, the operating frequency stays above the minimum operating frequency $f_{OP\_MIN}$. As shown in FIG. 4C, prior to the time $t_1$, the collector-emitter voltage across the output stage of the optocoupler varies in response to changes in the sensed load current; however, the collector-emitter voltage remains sufficiently great (e.g., greater than 1 volt) that the PNP bipolar transistor 320 remains on, the MOSFET fault switch 324 remains on, and the brownout voltage $V_{BO}$ (disable signal) remains between 1 and 2 volts as shown in FIG. 4B.

At the time $t_1$, a fault occurs on the output stage of the optocoupler 270 that causes the collector-emitter voltage of the phototransistor of the output stage to decrease to approximately 0 volts. As described above, the PNP bipolar transistor 320 turns off, which turns off the MOSFET fault switch 324. When the MOSFET fault switch turns off, the brownout voltage $V_{BO}$ on the brownout circuit output node 164 rises rapidly until the brownout voltage reaches the clamp voltage $V_{CLAMP}$, which is determined by the Zener diode 330. As shown in FIG. 4A, after the onset of the fault at the time $t_1$, the operating frequency drops to the minimum operating frequency $f_{OP}$, and the load current and the load voltage increase rapidly to respective maximum magnitudes. When the brownout voltage (disable signal) exceeds the 2-volt threshold of the brownout (BO) input terminal 160 at a time $t_2$, the driver IC 140 turns off the upper drive voltage on the upper drive terminal (MU) 152 and the lower drive voltage on a lower drive terminal (ML) 154. The operating frequency drops to zero and no energy is provided to the secondary circuit 104. Accordingly, the output filter capacitor 230 discharges and both the load current and the load voltage drop to respective zero magnitudes. The output current and output voltage drop sufficiently rapidly that the modified half-bridge resonant type DC-DC converter 300 with the fault detection circuit 310 meets the UL requirement to limit overvoltage and overcurrent to no more than 200 milliseconds when a fault (e.g., short) occurs in the output stage of the optocoupler 270.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A system for controlling a load current through a DC load, the system comprising:
    a self-oscillating switch driver integrated circuit (IC) having a first driver output and a second driver output coupled to a first semiconductor switch and a second semiconductor switch, the switch driver IC selectively applying driver output voltages to the first and second driver outputs to enable the first and second semiconductor switches at a variable frequency to generate a switched voltage signal referenced to a primary circuit ground reference, the switch driver IC varying the variable frequency in response to a current magnitude on a control input, the switch driver IC including a disable input terminal, the switch driver IC responsive to an active disable input signal on the disable input terminal to discontinue applying the driver output voltages;
    an isolation transformer having a primary winding configured to receive the switched voltage signal, the isolation transformer having at least one secondary winding that generates a secondary AC voltage responsive to the switched voltage signal received by the primary winding;
    a rectifier circuit connected to the at least one secondary winding of the isolation transformer to receive the secondary AC voltage, the rectifier circuit configured to rectify the secondary AC voltage to provide a DC voltage to the DC load to produce the load current through the DC load;
    a current sensor that senses a magnitude of the load current to generate a sensor voltage responsive to the magnitude of the load current, the magnitude of the load current responsive to the variable frequency of the switch driver IC;
    a feedback generator that outputs a feedback signal responsive to a difference between the sensor voltage and a reference voltage, the reference voltage representing a desired magnitude of the load current;
    an optocoupler having an input stage and an output stage, the input stage coupled to receive the feedback signal, the output stage having a variable impedance between a first output terminal and a second output terminal responsive to the feedback signal;
    a current control circuit having a first resistor and a second resistor connected in series between the control input of the switch driver IC and the primary circuit ground reference, the current control circuit further including a node between the first resistor and the second resistor;
    a voltage superposition circuit connected between a supply voltage and the node of the current control circuit, the voltage superposition circuit including the output stage of the optocoupler in series with at least one resistor, the voltage superposition circuit responsive to the feedback voltage received by the input stage of the optocoupler to vary the impedance of the output stage to thereby vary a superposition voltage applied to the node of the current control circuit and vary the magnitude of the current on the control input of the switch driver IC; and
    a fault detection circuit having a voltage sensor configured to sense a voltage across the output stage of the optocoupler, the fault detection circuit having an output coupled to the disable input terminal of the driver IC, the fault detection circuit responsive to the voltage across the output stage of the optocoupler being less than a minimum magnitude to activate the disable input signal on the disable input terminal to cause the driver IC to discontinue applying voltages to the first and second driver outputs.

2. The system as defined in claim 1, wherein the fault detection circuit comprises:
    a first transistor responsive to the voltage across the output stage of the optocoupler to conduct when the voltage across the output stage of the optocoupler is at least the minimum magnitude; and
    a second transistor coupled to an output of the first transistor, the second transistor conducting when the first transistor conducts to deactivate the disable signal, the second transistor turning off when the first transistor is not conducting to activate the disable signal.

3. The system as defined in claim 2, wherein:
    the disable input terminal of the driver IC is coupled to a supply voltage via a first resistor;
    the disable input terminal is coupled to a reference voltage via a second resistor and the second transistor, the disable input terminal having a first voltage when the second transistor conducts, the first voltage corresponding to an inactive disable input signal, the disable input terminal having second voltage when the second transistor is not conducting, the second voltage corresponding to an active disable input signal.

4. The system as defined in claim 3, wherein the second voltage is greater than the first voltage.

5. The system as defined in claim 1, wherein:
    the load current increases when the variable frequency decreases; and
    the load current decreases when the variable frequency increases.

6. The system as defined in claim 1, wherein:
    the voltage superposition circuit has at least a first state when the output stage of the optocoupler has a minimum impedance;
    the voltage superposition circuit has at least a second state when the output stage of the optocoupler has a maximum impedance;
    the superposition circuit applies a maximum superposition voltage to the node of the current control circuit when the superposition circuit is in the first state, the current control circuit responsive to the maximum superposition voltage to enable a minimum current to flow out of the control input of the switch driver IC; and the superposition circuit applies no superposition voltage to the node of the current control circuit when the superposition circuit is in the second state, the current control circuit responsive to the absence of the superposition voltage to enable a maximum current to flow out of the control input of the switch driver IC.

7. The system as defined in claim 6, wherein:

the switch driver IC is responsive to the minimum current flowing out of the control input to operate at a minimum variable frequency; and the switch driver IC is responsive to the maximum current flowing out of the control input to operate at a maximum variable frequency.

8. The system as defined in claim 7, wherein:

the voltage superposition circuit has at least a third state when the output stage of the optocoupler has an impedance between the minimum impedance and the maximum impedance;

the superposition circuit applies a mid-range superposition voltage to the node of the current control circuit, the mid-range superposition voltage having a magnitude less than the maximum voltage, the current control circuit responsive to the mid-range superposition voltage to enable a mid-range current to flow out of the control input of the switch driver IC; and the switch driver IC is responsive to the mid-range current flowing out of the control input to operate at a mid-range frequency between the maximum variable frequency and the minimum variable frequency.

9. A method for controlling a load current through a DC load in a secondary circuit wherein the secondary circuit is isolated from a primary circuit by an isolation transformer, the primary circuit including a DC-to-AC inverter, the DC-to-AC inverter including at least a first semiconductor switch and a second semiconductor switch, the two switches responsive to switch control signals generated by a switch controller to produce a switched input signal to a primary winding of the isolation transformer, the switch controller controlling the first and second semiconductor switches at a variable operating frequency responsive to a magnitude of a control current flowing out of a control terminal of the switch controller, the control current determined by a current control circuit, the secondary circuit including a secondary winding of the isolation transformer coupled to an AC-to-DC rectifier, the AC-to-DC rectifier providing the load current at a magnitude responsive to the switching frequency, the method comprising:

sensing the load current to generate a sensed load current magnitude;

comparing the sensed load current magnitude to a target load current magnitude;

generating a feedback signal responsive to a difference between the sensed load current magnitude and the target load current magnitude;

applying the feedback signal to a voltage superposition circuit via an output stage of an optical coupler to generate a superposition voltage responsive to the feedback signal, the superposition voltage responsive to a voltage across the output stage of the optocoupler;

applying the superposition voltage to an input node of the current control circuit to vary the control current flowing into the current control circuit from the control terminal of the switch controller to thereby vary the switching frequency of the switch controller; and sensing the voltage across the output stage of the optocoupler and selectively generating an active disable signal applied to a disable input terminal of the switch controller when the magnitude of the voltage across the output stage of the optocoupler is less than a minimum magnitude, the switch controller responsive to the active disable signal to discontinue generating the switch control signals to the semiconductor switches.

10. The method as defined in claim 9, further comprising:

increasing the switching frequency to decrease the load current; and decreasing the switching frequency to increase the load current.

11. The method as defined in claim 9, further comprising:

increasing the superposition voltage when the sensed magnitude of the load current is less than the target load current magnitude; and decreasing the superposition voltage when the sensed magnitude of the load current is greater than the target load current magnitude.

12. The method as defined in claim 9, further comprising:

generating an increased superposition voltage when the sensed magnitude of the load current is less than the target load current magnitude;

applying the increased superposition voltage to the input node of the current control circuit to generate a decreased control current flowing into the current control circuit from the control terminal of the switch controller, the switch controller reducing the switching frequency in response to the decreased control current, to thereby increase the magnitude of the load current.

13. The method as defined in claim 9, further comprising:

generating a decreased superposition voltage when the sensed magnitude of the load current is greater than the target load current magnitude;

applying the decreased superposition voltage to the input node of the current control circuit to generate an increased control current flowing into the current control circuit from the control terminal of the switch controller, the switch controller increasing the switching frequency to thereby decrease the magnitude of the load current.

14. A system for controlling the current through a DC load, the system comprising:

a switch controller having a first output and a second output, each output having an active state and an inactive state, the switch controller configured to turn on only one of the outputs to the respective active state at any time, the switch controller further configured to switch the first and second outputs at an operating frequency, the switch controller responsive to a control current on a control input to vary the operating frequency, the switch controller having a disable input that receives a disable signal, the switch controller responsive to an activation of the disable signal to discontinue turning on the first and second outputs;

a first semiconductor switch having a control input connected to the first output of the switch controller, the first semiconductor switch having a first terminal connected to a first voltage rail and having a second terminal connected to a common switch node;

a second semiconductor switch having a control input connected to the second output of the switch controller, the second semiconductor switch having a first terminal connected to the common switch node and having a second terminal connected to a second voltage rail;

an isolation transformer having a primary winding AC-coupled between the common switch node and the second voltage rail, the isolation transformer having a secondary winding connected to an AC-to-DC rectifier, the AC-to-DC rectifier providing a load current that flows through the DC load;

a current sensor that generates a sensor signal having a magnitude responsive to a magnitude of the load current;

a comparator having a first input coupled to receive the sensor signal and having a second input that receives a reference magnitude, the comparator having an output that generates a feedback signal responsive to a difference between the magnitude of the sensor signal and the reference magnitude;

a current control circuit coupled to the control input of the switch controller, the current control circuit comprising at least a first resistor in series with a second resistor between the control input and a voltage reference, the current control circuit further comprising an input node at a junction between the first resistor and the second resistor;

a voltage superposition circuit having an input and an output, the output of the voltage superposition circuit connected to the input node of the current control circuit, the input of the voltage superposition circuit connected to the output of the comparator, the voltage superposition circuit comprising an optocoupler having an input stage coupled to the input of the voltage superposition circuit, the optocoupler having an output stage having a variable impedance responsive to the feedback signal, the output stage of the optocoupler connected in series with at least one resistor between a supply voltage and the input node of the current control circuit to superimpose a variable voltage on the input node of the current control circuit; and a fault detection circuit having a voltage sensor configured to sense a voltage across the output stage of the optocoupler, the fault detection circuit having an output coupled to the disable input of the switch controller, the fault detection circuit responsive to the voltage across the output stage having a magnitude less than a minimum magnitude to activate the disable signal.

15. The system as defined in claim 14, wherein the fault detection circuit comprises:

a first transistor having a control terminal configured to receive the voltage across the output stage of the optocoupler, the first transistor responsive to the voltage across the output stage of the optocoupler to conduct when the voltage across the output stage of the optocoupler is at least the minimum magnitude; and a second transistor having a control terminal coupled to an output of the first transistor, the second transistor conducting when the first transistor conducts to deactivate the disable signal, the second transistor turning off when the first transistor is not conducting to activate the disable signal.

16. The system as defined in claim 15, wherein:

the disable input terminal of the driver IC is coupled to a supply voltage via a first resistor;

the disable input terminal is coupled to a reference voltage via a second resistor and the second transistor, the disable input terminal having a first voltage when the second transistor conducts, the first voltage corresponding to an inactive disable input signal, the disable input terminal having second voltage when the second transistor is not conducting, the second voltage corresponding to an active disable input signal.

17. The system as defined in claim 14, wherein:

the load current increases when the variable frequency decreases; and the load current decreases when the variable frequency increases.

18. The system as defined in claim 14, wherein:

the voltage superposition circuit has at least a first state when the output stage of the optocoupler has a minimum impedance;

the voltage superposition circuit has at least a second state when the output stage of the optocoupler has a maximum impedance;

the superposition circuit applies a maximum superposition voltage to the input node of the current control circuit when the superposition circuit is in the first state, the current control circuit responsive to the maximum superposition voltage to enable a minimum current to flow out of the control input of the switch controller; and the superposition circuit applies no superposition voltage to the input node of the current control circuit when the superposition circuit is in the second state, the current control circuit responsive to the absence of the superposition voltage to enable a maximum current to flow out of the control input of the switch controller.

19. The system as defined in claim 18, wherein:

the switch controller is responsive to the minimum current flowing out of the control input to operate at a minimum variable frequency; and the switch controller is responsive to the maximum current flowing out of the control input to operate at a maximum variable frequency.

20. The system as defined in claim 19, wherein:

the voltage superposition circuit has at least a third state when the output stage of the optocoupler has an impedance between the minimum impedance and the maximum impedance;

the superposition circuit applies a mid-range superposition voltage to the node of the current control circuit, the mid-range superposition voltage having a magnitude less than the maximum voltage, the current control circuit responsive to the mid-range superposition voltage to enable a mid-range current to flow out of the control input of the switch controller; and the switch controller is responsive to the mid-range current flowing out of the control input to operate at a mid-range frequency between the maximum variable frequency and the minimum variable frequency.

* * * * *